(12) United States Patent
Altenschulte

(10) Patent No.: US 7,880,335 B2
(45) Date of Patent: Feb. 1, 2011

(54) POWER BACKUP SYSTEM FOR OFFSHORE WIND GENERATORS

(75) Inventor: Markus Altenschulte, Spelle (DE)

(73) Assignee: General Electric Company, Schenectady, NY (US)

( * ) Notice: Subject to any disclaimer, the term of this patent is extended or adjusted under 35 U.S.C. 154(b) by 577 days.

(21) Appl. No.: 11/946,119

(22) Filed: Nov. 28, 2007

(65) Prior Publication Data

US 2009/0134625 A1 May 28, 2009

(51) Int. Cl.
*H02J 9/00* (2006.01)
*H02P 9/04* (2006.01)

(52) U.S. Cl. .......................................... 307/68; 290/55
(58) Field of Classification Search ................... 307/68, 307/115; 290/44, 55
See application file for complete search history.

(56) References Cited

U.S. PATENT DOCUMENTS

| | | | | |
|---|---|---|---|---|
| 4,565,929 | A * | 1/1986 | Baskin et al. | 290/44 |
| 5,902,962 | A * | 5/1999 | Gazdzinski | 174/113 R |
| 6,563,228 | B1 * | 5/2003 | Schlett | 290/2 |
| 7,298,055 | B2 * | 11/2007 | Galloway et al. | 290/44 |
| 7,606,638 | B2 * | 10/2009 | Fortmann et al. | 700/287 |

* cited by examiner

*Primary Examiner*—Michael Rutland Wallis
(74) *Attorney, Agent, or Firm*—Global Patent Operation; Douglas D. Zhang

(57) ABSTRACT

The inventions concerns a cable comprising a cable jacket and at least two medium voltage wires disposed within the cable jacket for transporting medium voltage current and at least two low voltage wires disposed within the cable jacket for transporting a low voltage current. Further, it concerns a wind turbine having a generator for generating electricity, wherein the generator being electrically connected to at least two medium voltage wires for feeding the generated electricity into a grid, the wind turbine having further a low voltage network for providing low voltage power to low voltage consumers, the low voltage network being electrically connected to a low voltage cable, wherein the low voltage cable and the medium voltage wires are accommodated in a common cable jacket. Finally it concerns a wind park comprising at least two wind turbines, each of the wind turbines having a generator for generating electricity, wherein the generator being electrically connected to at least two medium voltage wires for feeding generated medium voltage current to a grid, the wind turbines having further a low voltage network for providing low voltage power to low voltage consumers of the wind turbine, the low voltage network being electrically connected to a low voltage cable, wherein the low voltage cable and the medium voltage wires are accommodated in a common cable jacket.

6 Claims, 4 Drawing Sheets

POWER BACKUP SYSTEM FOR OFFSHORE WIND GENERATORS

BACKGROUND OF THE INVENTION

The present invention relates to a cable including a cable jacket and at least two medium voltage wires disposed within the cable jacket for transporting medium voltage current and a wind turbine having a generator for generating electricity. It further relates to a wind park with at least two wind turbine generators.

Wind turbines are commonly used to convert kinetic energy of an air stream into electrical energy. They include a transformer to transform the generated low voltage electricity to a medium voltage, for delivering the energy via a medium voltage cable to a medium voltage grid. Under normal conditions a wind turbine generates enough energy for its internal use, e.g. to power an elevator, a crane or an illumination in a tower of the wind turbine to provide enough light for an engineer or technician inspecting the wind turbine. But, often the wind turbine has to be stopped for an inspection and the connection of the transformer to the grid has to be cut. Offshore wind turbines that are disconnected from the medium voltage collector system for repair or maintenance work cannot provide electrical power. In these cases an auxiliary power source has to be provided for most of the work, e.g. to power the elevator, the crane or the illumination.

For example in case of offshore wind turbines the auxiliary power must be generated in place, e.g. by a small generator placed in the tower that is powered by conventional fuels. The use of fuel based mobile generators is expensive in offshore applications and offshore wind turbines are often placed in protected landscape/environment such that strict regulations concerning the handling of fuel apply thereto, if it is allowed at all. A further possibility is to place an auxiliary generator on a boat and to connect the auxiliary power circuit in the wind turbine with the generator on the boat. In this case, it is difficult to connect the circuits under all weather conditions and this limits the possibilities for operation and maintenance works. If batteries are used as auxiliary power supplies for the illumination or the like, they have to be regularly replaced by new ones. Battery backup systems can be used for low power consuming equipment but will not provide enough power for most of the tools required for maintenance and repair jobs. Thus, batteries or mobile generator systems cause high costs mainly on the lifetime.

BRIEF DESCRIPTION OF THE INVENTION

In view of the above, there is provided a cable including a cable jacket and at least two medium voltage wires disposed within the cable jacket for transporting medium voltage current and at least two low voltage wires disposed within the cable jacket for transporting a low voltage current.

Medium voltage current with respect to the embodiments of the present patent application includes in particular a current between 10 kV and 50 kV, typically between 20 and 30 kV. Low voltage current in view of the embodiments of the present patent application includes in particular current between 400 and 1000V, typically between 400V and 690V. The specified ranges apply in particular for three phase alternate current. Further, a cable for a three phase current according to this invention may includes three or more wires, typically four or five wires.

According to a second embodiment, a wind turbine has a generator for generating electricity, wherein the generator being electrically connected to at least two medium voltage wires for feeding the generated electricity into a grid, the wind turbine having further a low voltage network for providing power to low voltage consumers, the low voltage network being electrically connected to a supply cable, wherein the supply cable and the medium voltage wires are accommodated together in a common cable jacket.

According to a further embodiment, a wind park includes at least two wind turbines, each of the wind turbines having a generator for generating electricity, wherein the generator being electrically connected to at least two medium voltage wires for feeding generated medium voltage current to a grid, the wind turbines having further a low voltage network for providing low voltage power to low voltage consumers of the wind turbine, the low voltage network being electrically connected to a low voltage cable, wherein the low voltage cable and the medium voltage wires are accommodated in a common cable jacket.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
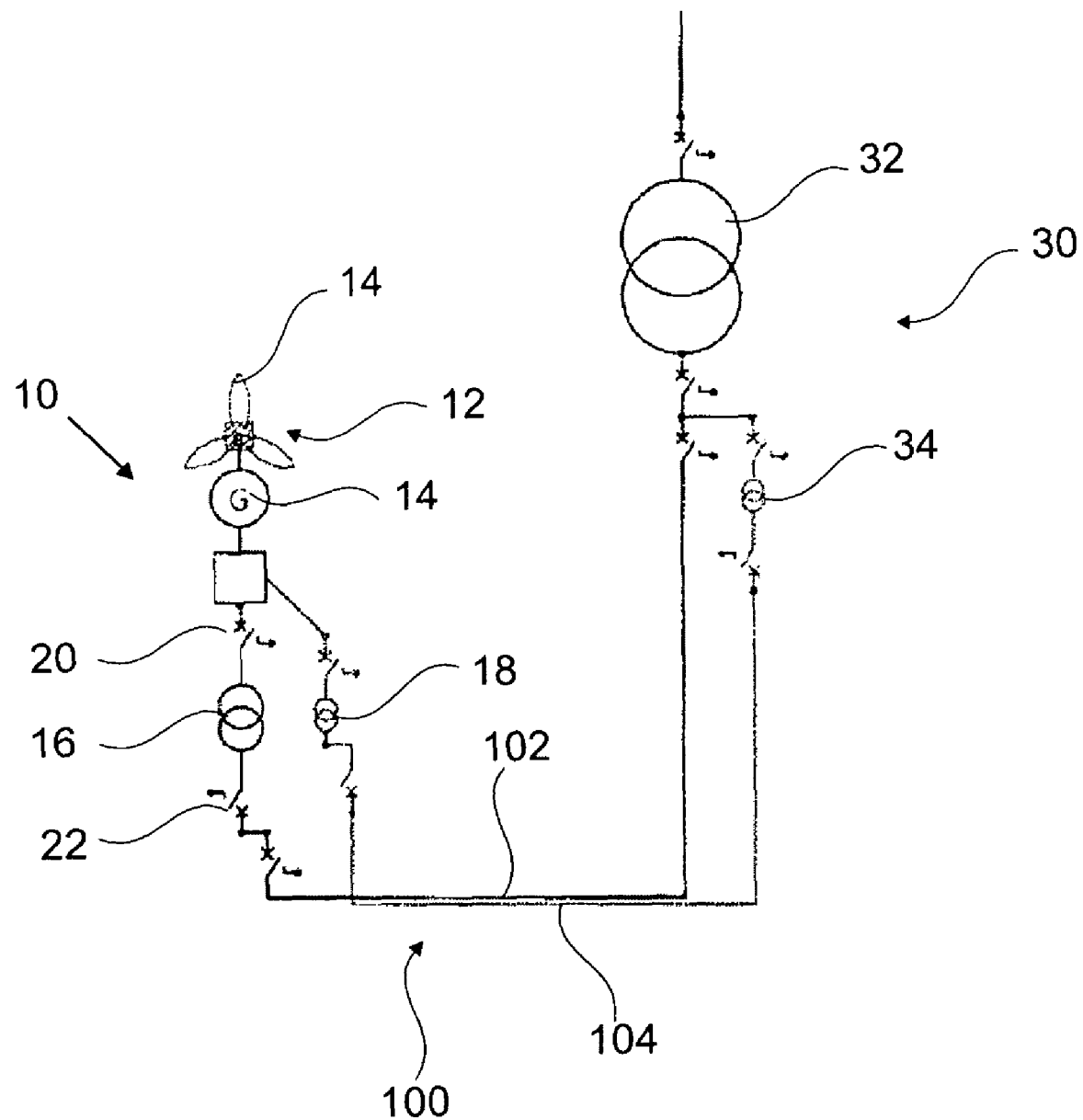
FIG. 1 shows a schematic drawing of an offshore wind turbine in a first embodiment.

FIG. 1 is schematic drawing of an embodiment of a wind turbine 10 that may be located offshore. The wind turbine 10 has a rotor 12 with three blades. The rotor 12 is connected to a generator 14 to convert rotational energy of the rotor into electrical energy. The generator 14, generally located in a nacelle of the wind turbine generator, has an electrical output having a current with an output voltage of about 500V to 1 kV. This generated current is used to feed an auxiliary electrical network in the wind turbine 10. The auxiliary electrical network is used to power an elevator, lights or other tools within the wind turbine generator 10. Further, the output current of the generator 14 is fed into a medium power transformer or primary wind turbine transformer 16. Thus, in normal operation, the offshore wind turbines will use the medium power transformer 16 to transform the output current of the generator 14 to a medium voltage current, e.g. in a current in the range from 20 to 50 kV. Typically, the medium power transformer 16 is located in each offshore tower to provide electrical power. The medium voltage current is used to transport the electrical energy to avoid losses. To provide flexibility in wind turbine 10, the medium power transformer 16 can be disconnected on its primary connection and secondary connection with a switch e.g. an interrupter 20, 22. Thus, if interrupter 20 is opened, generated current from the generator is prevented to be fed into the transformer.

In view of the present patent application a cable generally includes a cable jacket that is accommodating at least two wires for transporting electrical current. The two wires are isolated with respect to each other. The isolation may be formed by the cable jacket itself or at least one wire or all wires may be coated by an isolating material.

The primary wind turbine transformer 16 is connected to a cable 100 containing typically medium voltage wires 102 adapted for a current in the range of 10 kV to 50 kV for feeding medium voltage current into a grid. In case of an offshore wind turbine 10 the cable 100 may be a sea cable. If this medium voltage transformer 16 and/or connected equipment has or have to be disconnected from the medium voltage grid for maintenance or repair works, a power backup system is needed, because the auxiliary electricity network would be not powered by the generator 14 or the medium voltage cable 102. For this purpose, the cable 100 contains additionally low voltage wires, in particular in a further embodiment a low voltage cable 104. An auxiliary transformer 18, typically also located in the tower of the wind turbine generator 10, is connected to the low voltage cable 104 to provide the expected power rating e.g. 690 VAC or 400 VAC for the auxiliary electricity network in the wind turbine 10. For the case of repair of the auxiliary transformer 18, the auxiliary transformer may be disconnected from the low voltage cable 104 and the auxiliary electricity network in the wind turbine generator 10 respectively using two switches, e.g. interrupters, arranged on the primary and the secondary side of the auxiliary transformer respectively.

In a further embodiment in which the low voltage cable 104 transports low voltage current that may be directly fed into the auxiliary electrical network of the wind turbine generator 10, no auxiliary transformer 18 is needed.

The sea cable 100 is connected to a substation 30 with a substation transformer 32 that transforms the current on the medium voltage cable 102 to a high voltage current. The substation connects generally the medium voltage grid fed by the wind turbine generator 10 with a utility grid. Thus, a high voltage cable 33 may be connected to the utility grid. Further, the substation contains a substation auxiliary transformer 34 that transforms medium voltage current from the medium voltage grid into a low voltage current to feed it into the low voltage cable 104. Thus, electrical power is provided to the auxiliary electricity network in the wind turbine 10 during maintenance works.

The system works as follows. If, for example, the medium power transformer 16 of the wind turbine 10 should be inspected, it is disconnected from the network with interrupters 20, 22. Thus, a technician can work without danger to get an electrical shock on the medium power transformer 16. In this case the auxiliary electricity network of the wind turbine generator 10 is powered via the cable 100, in particular the low power cable 104 by the sub station 30 that feeds low voltage current into the low voltage cable 104.

Figure 2:
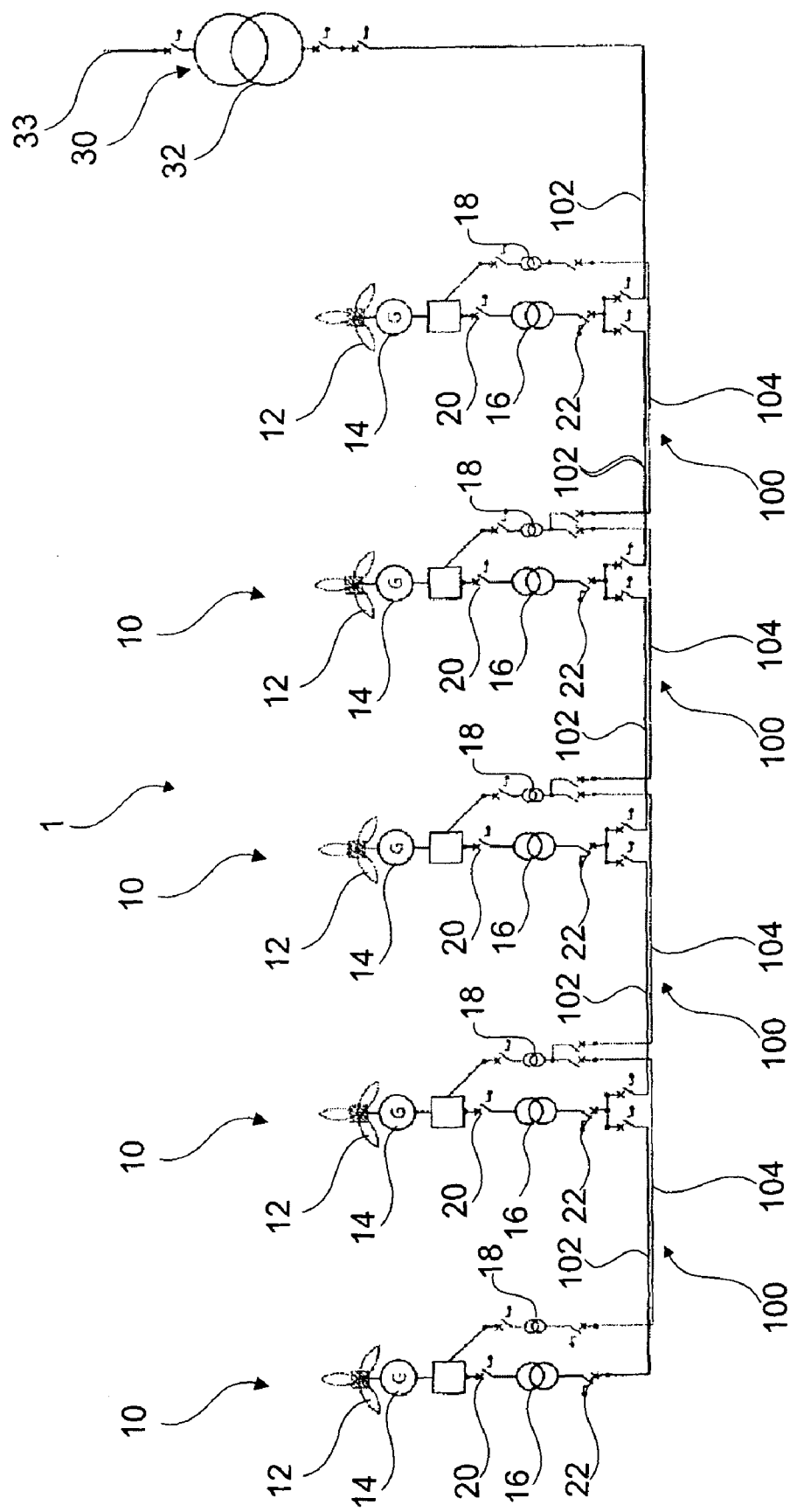
FIG. 2 shows a schematic drawing of an offshore wind park in a second embodiment.

FIG. 2 shows a further embodiment. Same features are designated with the same reference numbers as for the embodiment shown in FIG. 1. FIG. 2 shows a wind farm 1 including several wind turbines 10. A wind park or wind farm 1 according to the present embodiment should include at least two wind turbines. Two adjacent wind turbines 10 are connected with a cable 100 containing medium voltage wires 102 and a low voltage cable 104. The cable 100 may be in case of an offshore wind park be a sea cable. Electrically all wind turbines 10 are connected in parallel. Thus, the wind turbines 10 together with the sea cable 100 form a medium power network or grid and a low voltage network, wherein the medium power transformers 16 are electrically connected to the medium voltage network in parallel and the auxiliary transformers 18 are connected to the low voltage network in parallel.

Thus, when a first wind turbine 10 is disconnected from the medium voltage grid or the medium power wires 102 using e.g. the interrupters 20, 22, an adjacent, second wind turbine 10 that is connected to the low voltage grid feeds with its generator 14 a low voltage current into the auxiliary electricity network of the second wind turbine 10. The electrical energy is transformed by the auxiliary power transformer 18 of the second wind turbine and feed into the low voltage cable 104. Then, due to the low voltage network to which also the first wind turbine 10 is connected, the low voltage current in the low voltage cable 104 is transformed by the auxiliary transformer 18 of the first wind turbine 10 to feed the auxiliary electricity network of the first wind turbine 10. Thus, enough electrical power for the maintenance works is provided in the auxiliary network. The second wind turbine must not necessarily be an adjacent wind turbine generator, but could be any wind turbine in the wind farm or wind park that is connected electrically in parallel with the low voltage cable 104 to of the sea cable(s) 100 to provide low voltage current to the first wind turbine.

In a further embodiment, if two wind turbines are located close to each other no auxiliary transformer may be needed. Thus, the auxiliary electricity network of a second wind turbine is connected without an auxiliary transformer 18 to the low voltage cable 104 to feed low voltage current into the low voltage network. Therefore, also the first wind turbine may be connected without an auxiliary transformer 18 to the low voltage network. Hence, even the procurement of auxiliary transformers 18 can be avoided.

Figure 3:
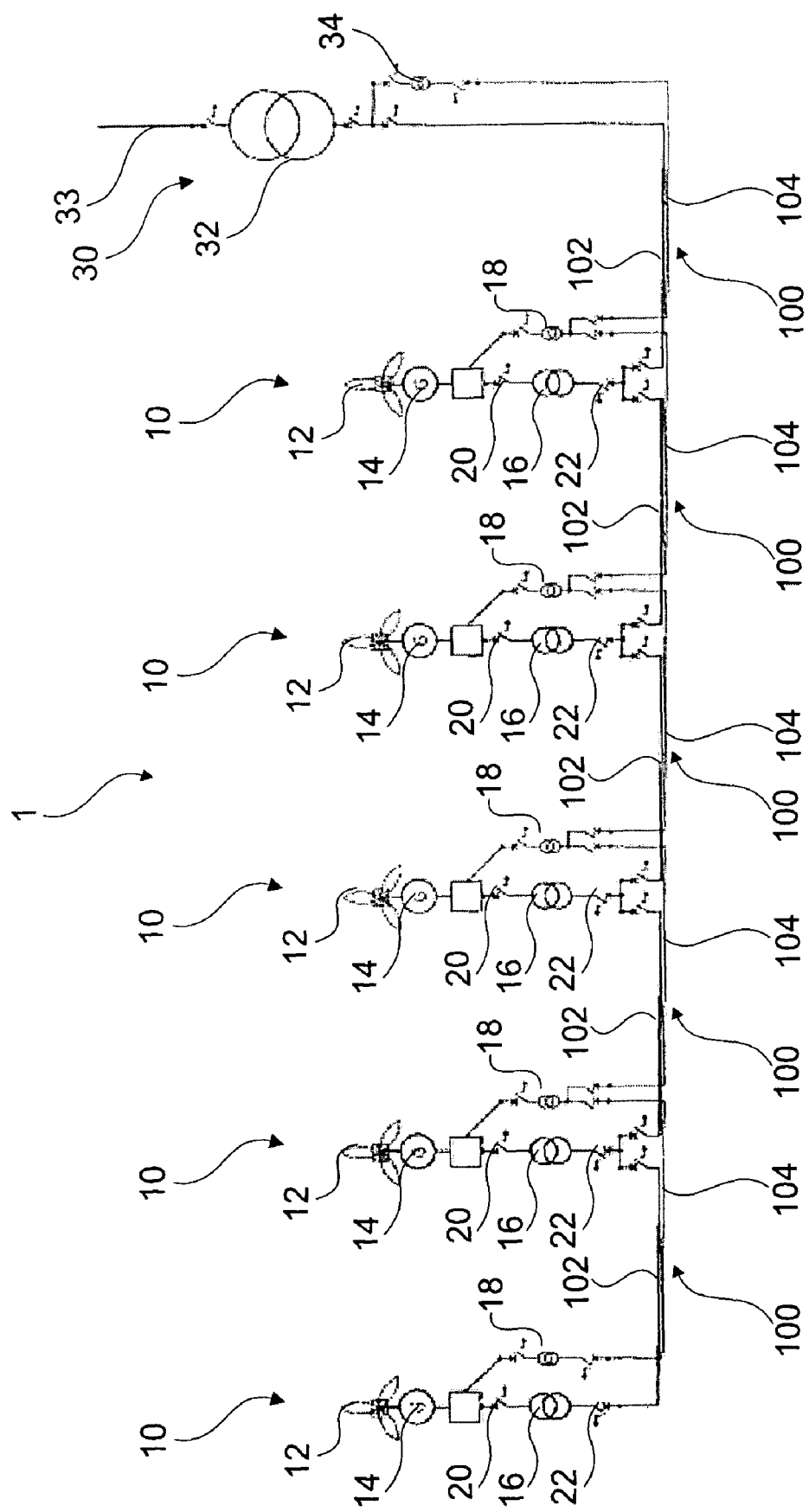
FIG. 3 shows a schematic drawing of an offshore wind park in a third embodiment.

In a further embodiment, shown in FIG. 3, the embodiments shown in FIGS. 1 and 2 are combined. In particular same reference numbers refer to the same devices. In the embodiment of FIG. 3 the low voltage network is also connected to a sub station 30 that includes a sub station auxiliary transformer 34 to convert medium voltage current into low power current for feeding the last into the low voltage cable 104. Thus, even in case all wind turbines are not working, e.g. due to a calm, low voltage electricity is available in all wind turbines 10 for maintenance works via the cables 100.

For all embodiments of the present invention it should be noted that an medium power transformer and the auxiliary transformer, if the last is present in the wind turbine generator, have different dimensions, due to the different amplitudes of the current, namely the low voltage current and the medium voltage current, such that the auxiliary transformer has a much more favorable prize.

Figure 4:
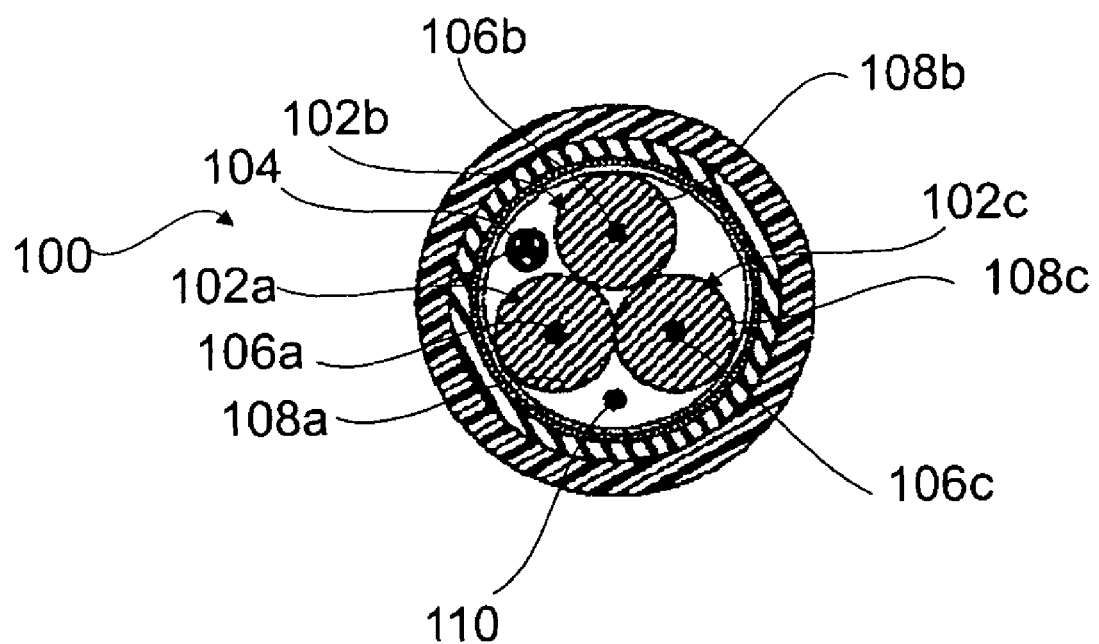
FIG. 4 shows a section of a sea cable.

FIG. 4 shows a typical embodiment of the cable 100. The cable could be used as sea cable for the invention according the first, second and third embodiment. In these cases the cable 100 is used to connect a first wind turbine 10 to a second wind turbine 10 or to connect a wind turbine 10 to a sub station 30. The cable 100 has a multilayered outer casing that is designed for the use as sea cable. The outer casing is forming a cable jacket. The layers of the cable jacket may be a binder tape, bedding, armour and serving layers. Within the cable jacket three medium voltage wires 102*a*, 102*b*, 102*c* are accommodated for transporting a three phase medium voltage current, e.g. typically from 10 kV to 50 kV. Each medium voltage wire 102*a*, 102*b*, 102*c* has a medium voltage/high voltage conductor 106a, 106b, 106c that may be coated by an insulator 108a, 108b, 108c. The three wires 102a, 102b, 102c are touching each other. Typically, an inner surface of the cable jacket is in contact with at least two of the three medium voltage wires, typically with all three medium voltage wires 102a, 102b, 102c. Between the three medium voltage wires 102a, 102b, 102c a low voltage cable 104 is disposed, typically a three phase current cable. The low voltage cable 104 can also, in a preferred embodiment, include four or five conductors or wires. The low voltage cable has a diameter that is much smaller that the cable jacket, in particular the inner diameter of the cable jacket is between 5 and 10 times greater than the low voltage cable 104, typically between 6 and 7 times greater than the low voltage cable. In a typical embodiment the low voltage cable has a diameter that is 1 to 10 times smaller that the medium voltage wire, in an other embodiment 2 to 6 times smaller, a further embodiment 3 times smaller. In a further embodiment other cables like a communication cable 110, typically a fiber optic communication cable 110, may be added to the cable for communication and regulation purposes of the wind turbines. In a typical embodiment the cable is a sea cable that may be used to join an offshore wind turbine to another offshore wind turbine or a sub station. That means the supply cable or low voltage cable and the medium voltage wires have a common cable jacket.

It should be noted that in general the low power cable can not be very long, as in those cases the electrical losses would be too high, such that in case of an offshore wind park the low voltage cable must be fed by a low voltage source in the vicinity, like other wind turbines or a sub station.

The embodiments of the present patent application will provide an electrical power backup in an environmental friendly way to wind turbines that are disconnected from the main power cable. Instead of additional generators or battery packages that are expensive and require replacement or refueling and have time limitations, a solution that uses already existing sea cables is provided and is fed out of the produced energy of the wind turbine generators in the neighbor ship. The list of additional required equipment is short and depends on the used voltage level in the power backup system. Further, it is very safe. The embodiments of the present patent application do show a system to use existing sea cables between the offshore wind turbine towers to provide electrical power during maintenance. One or more turbines next to the effected turbine will provide electrical power over a low voltage distribution system inside the existing sea cable. The composite sea cable will, generally speaking, have one low voltage cable inside. This cable system will be connected in parallel to all wind turbines. An additional transformer for the expected power rating will be installed at each wind turbine and will be used to connect the low voltage system of the wind turbine to this backup power cable. Hence, a simple and reliable auxiliary electrical power source is created.

Further, the wind park or the wind turbine according to the present patent application has economic advantages, as e.g. sea cables are produced specifically for the operator of offshore wind turbines. In a sea cable for medium voltage enough space is provided such that an additional low voltage cable would not require new dimension of the sea cable. Further the additional equipment like low voltage transformers are cheaper to procure and to maintain compared to additional fuel powered generators or batteries. Even, in case of already existing sea cables it might be considered to add an additional low voltage cable in a space between the medium voltage wires in the sea cable.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A wind park comprising:
    at least two wind turbines, each of the wind turbines having a generator for generating electricity, wherein the generator comprises an electrical output connected in parallel to a medium voltage network for supplying generated medium voltage current to a grid;
    each of the wind turbines being further coupled to a low voltage network for providing low voltage power to the wind turbines
    wherein the low voltage network provides low voltage power to the wind park when at least one wind turbine is operating.

2. The wind park according to claim 1, further comprising a sub station connected to the low voltage network, the sub station being adapted to connect the wind park to the grid for providing an alternate source of low voltage power to the low voltage network.

3. The wind park according to claim 2, wherein the sub station comprises a substation transformer for transforming high or medium voltage current to a low voltage current for supplying the low voltage network with electrical power.

4. The wind park according to claim 1, wherein a common cable is provided to carry wires associated with each of the medium voltage network and the low voltage network.

5. The wind park according to claim 1, wherein the at least two wind turbines are offshore wind turbines.

6. The wind park according to claim 1, wherein at least one of the at least two wind turbines comprises a low voltage transformer coupled between the respective generator and the low voltage network for supplying low voltage power to the low voltage network.

* * * * *